(12) United States Patent
Viljanen

(10) Patent No.: US 8,984,997 B2
(45) Date of Patent: Mar. 24, 2015

(54) DEVICE FOR STABILIZING ROTATION OF A BLADE IN A CIRCLE SAW

(76) Inventor: Reijo Viljanen, Tampere (FI)

( * ) Notice: Subject to any disclaimer, the term of this patent is extended or adjusted under 35 U.S.C. 154(b) by 179 days.

(21) Appl. No.: 13/825,955

(22) PCT Filed: Sep. 23, 2010

(86) PCT No.: PCT/FI2010/000057
§ 371 (c)(1),
(2), (4) Date: Apr. 22, 2013

(87) PCT Pub. No.: WO2012/038578
PCT Pub. Date: Mar. 29, 2012

(65) Prior Publication Data
US 2013/0220096 A1    Aug. 29, 2013

(51) Int. Cl.
 B27B 5/38    (2006.01)
 B23D 47/00   (2006.01)
 B26D 5/02    (2006.01)
(52) U.S. Cl.
 CPC B26D 5/02 (2013.01); B23D 47/00 (2013.01); B27B 5/38 (2013.01)
 USPC .............................................. 83/523; 83/829
(58) Field of Classification Search
 USPC ................................... 83/162, 829, 821, 523
 See application file for complete search history.

(56) References Cited

U.S. PATENT DOCUMENTS

|   |   |   |   |   |
|---|---|---|---|---|
| 595,062 A | * | 12/1897 | Halcomb | 83/828 |
| 4,030,386 A | * | 6/1977 | Poetzsch et al. | 83/871 |
| 4,257,301 A | * | 3/1981 | Tuomaala | 83/835 |
| 4,961,359 A | * | 10/1990 | Dunham | 83/169 |
| 5,159,866 A | * | 11/1992 | Dunham | 83/169 |
| 5,367,257 A | * | 11/1994 | Garshelis | 324/207.22 |
| 7,584,688 B1 | * | 9/2009 | Tegen | 83/523 |
| 8,250,954 B2 | * | 8/2012 | Dietz et al. | 83/13 |
| 8,776,658 B2 | * | 7/2014 | Rudolph et al. | 83/820 |
| 2008/0121083 A1 | * | 5/2008 | Kim et al. | 83/821 |
| 2008/0302227 A1 | * | 12/2008 | Viljanen | 83/820 |
| 2009/0126549 A1 | * | 5/2009 | Dietz et al. | 83/817 |
| 2010/0224046 A1 | * | 9/2010 | Osbourne | 83/522.25 |
| 2013/0220096 A1 | * | 8/2013 | Viljanen | 83/829 |
| 2014/0331845 A1 | * | 11/2014 | Viljanen | 83/820 |

* cited by examiner

*Primary Examiner* — Sean Michalski
(74) *Attorney, Agent, or Firm* — Galbreath Law Offices, P.C.; John A. Galbreath

(57) ABSTRACT

Equipment for stabilizing rotation of a blade in a circle saw and for staying at the wanted sawing line which equipment comprises the formation devices (1,2); (7,8); (10,11) of a magnetic field in connection with a ferrous metallic circle saw blade (3) and equipment for adjusting the intensity of the mentioned magnetic field, such as a sensor (14) that measures the sideway position of a control center (13) and a circular blade (3). Of the formation devices of the magnetic field metallic parts (1); (7) or (10) that direct at least magnetic flux in the last resort to the circle saw blade (3) or part of them are located in relation to the circle saw blade (3) outside its toothing (4), at the location of the teeth essentially to the level of the circle saw blade (3).

7 Claims, 2 Drawing Sheets

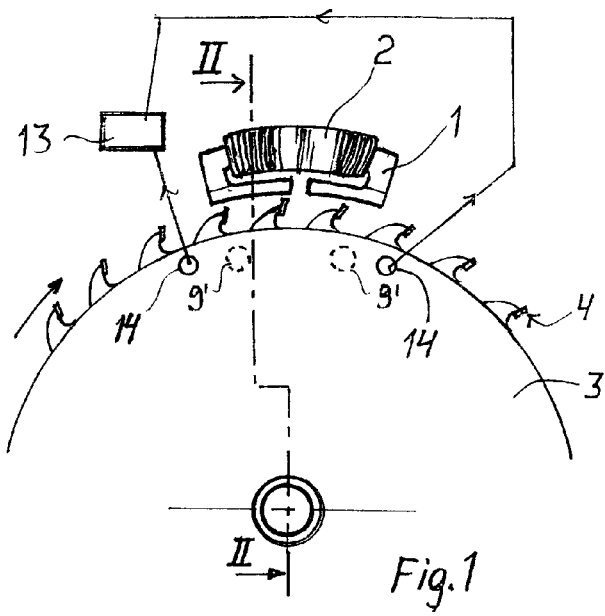
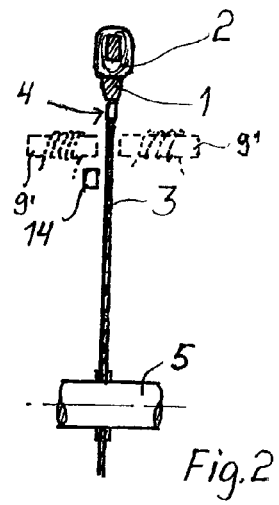
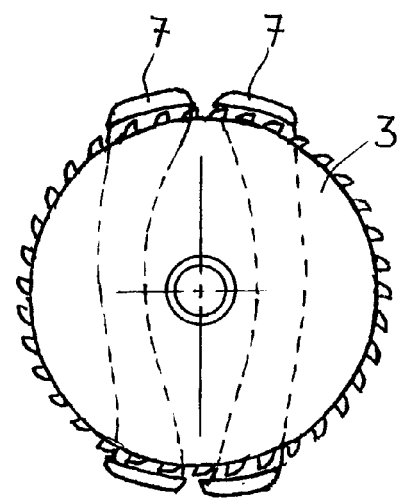
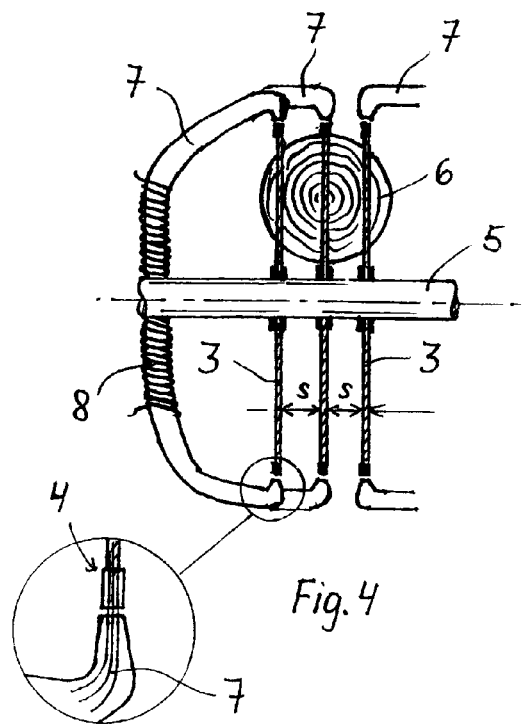

DEVICE FOR STABILIZING ROTATION OF A BLADE IN A CIRCLE SAW

The invention relates to an equipment for stabilizing rotation of a blade in a circle saw and for staying at the desired sawing line which equipment comprises formation devices for a magnetic field in connection with a ferrous metallic circle saw blade and comprises devices for adjusting the intensity of the mentioned magnetic field, such as a sensor that measures the sideway position of a control center and a circular blade.

Previously magnets meant for stabilizing rotation of blades in circle saws are known from a Finnish printed patent specification FI-107319 with the help of which magnets one aims to keep the blade at the sawing line and to keep it stable. While being controlled by this endless saw blade the magnets can be located both at the visible part of the blade and at the location of the wood in which case the force is conveyed through the wood. In the case of the circle saw blade the magnets are located at the visible side part of the blade that can have pulling or pushing magnets. The magnets can be located at the side part also at the location of the wood to be sawed if this kind of side part can be seen, in other words the diameter of the blade is large enough in relation to the wood to be sawed. In this case maximum sized wood cannot be sawed with the circle saw unless the magnetic devices are removed from the path of the wood. However, precisely the woods with the largest diameter demand the stabilizing of a circular blade performed by the magnetic devices. With known solutions this problem cannot be solved. With the known solutions also an accurate and fast control system must be created for the control magnet with its back couplings so that the magnetizing force does not pull or push too much.

With the equipment according the invention a disadvantage occurring in this kind of sawing can be solved and it is characteristic of the equipment that of the formation devices of a magnetic field at least the metallic parts that direct the magnetic flux in the last resort to the circle saw blade are located in relation to the circle saw blade outside its toothing, at the location of the teeth essentially to the level of the circle saw blade.

The advantage of the equipment according to the invention is the fact that the parts belonging to it can all be located in connection with the circle saw blade in such a way that they don't reduce the maximum size of the wood to be sawed. They can be located to various periphery angles of the circle saw blade when needed. The magnetic stabilization can be switched on when needed when the sensor of the adjusting device detects that the blade strays from the line due to stress or fluctuation. Too strong magnetizing force does not move the blade to an erroneous position, such as in known equipments. Due to this the controlling arrangement that adjusts the magnetizing force is simple because the force must be increased only so much that the blade comes back to the sawing line. The excessive increase of the force does not do any harm. The metallic parts that convey magnetic flux to the circular blade can be located at the circle of the circular blade at all other circle positions except at those that are at the path of the wood to be sawed.

In the following the invention is described more detailed by referring to the accompanying drawings in which FIG. 1 shows a stabilization equipment of the circular blade as a side view.

FIG. 2 shows the solution of the FIG. 1 as a cut view along the line II-II.

FIG. 3 shows an alternative solution seen from the direction of an axis.

FIG. 4 shows the placement of several circular blades to the axis by using the stabilization devices shown by the FIG. 3.

Figures 5, 6:
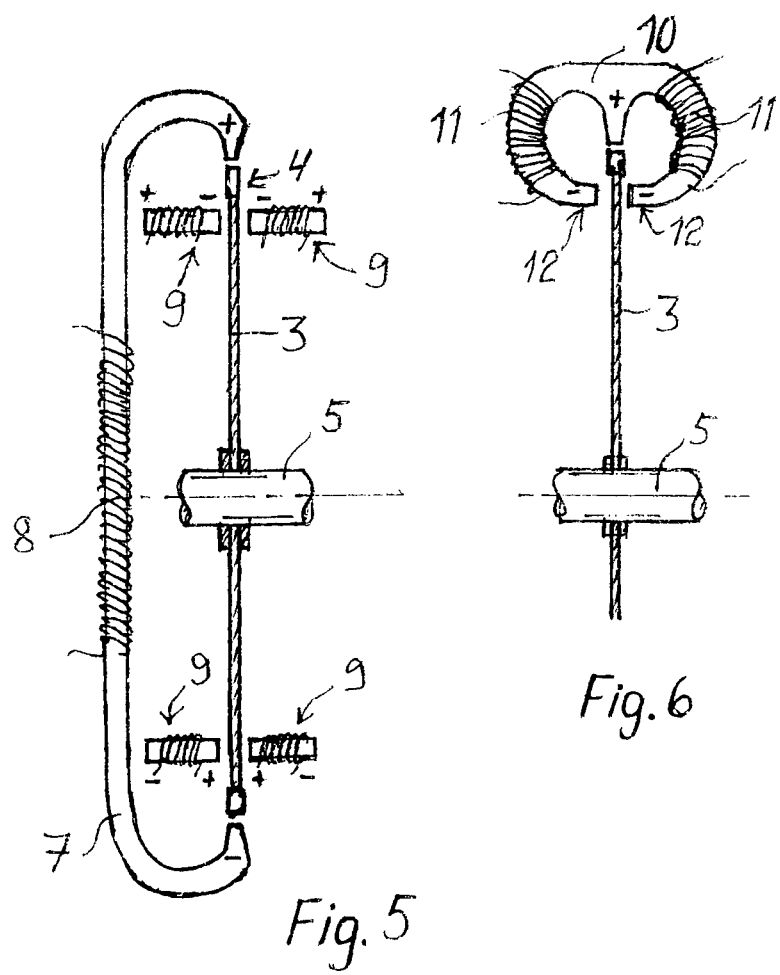
FIG. 5 shows a placement of the magnets that adjust the knife-edge flange by pushing.
FIG. 6 shows another placement of the magnets that adjust the knife-edge flange by pushing.

In the FIG. 1 a stabilization equipment of a circular blade 3 according to the invention is located above the circle saw blade 3 equipped with teeth 4 to which stabilization equipment a ferrous metal part 1 and a winding 2 attached to it belong for formation of a magnetic field with the help of electricity. The magnetic flux that becomes created moves from one end of the part 1 to a ferrous metallic circle saw blade 3 and returns nearly immediately back to the other end of the part 1. FIG. 2 shows the reciprocal location of the circular blade 3 located at the axis and the part 1 in which case they are at the same level of the knife-edge flange 3. When the part 1,2 is energized to become a magnet and the parts 1,2 are not allowed to near the toothing 4, the formed magnet or the part 1 pulls the circular blade towards itself and at the same time keeps at least the upper end of the circular blade 3 centralized at the line of the lower end of the part 1. The lower end of the part 1 is narrowed in such a way that its width towards the toothing 4 is approximately the same as the width of the teeth 4. This design makes sure that the magnetic part 1 pulls the upper end of the circular blade to a location defined by the part 1 in the situation of the FIGS. 1 and 2. The position of the circular blade 3 sideways is measured for example with the help of sensors 14 located in the places shown by the FIG. 1 the position information of which is received at the control center 13. Such sensors measuring the side position of the circular blade are needed in all cases in which magnetizing forces are adjusted.

The stabilization/control devices functioning with magnetizing force [and] being like in the FIG. 1 can be located at various circle positions of the circle saw blade 3 apart from those that are at the path of the wood.

In the FIG. 3 the direction of the magnetic flux through the circular blade 3 to the opposite side with the help of a crosshead clamp like magnetizing piece 7 is shown. A winding 8 that magnetizes the piece 7 is located at the location suitable for the purpose. The pieces 7 can be several at various circle positions around the circular blade 3.

FIG. 4 shows several circular blades 3 at the axis 5. Own magnetic stabilization devices 7, 8 can be installed for all the circular blades 3. The pieces 7 of the stabilization devices that become magnetized with their windings 8 are located at the both sides of the group of circular blades. In the picture enlargement one can see the passage of the magnetic flux from the part 7 through the tooth 4 to the circular blade 3 shown as lines. The magnetic flux aims to keep the tooth part of the circular blade exactly at the location of the point of the part 7. If sufficient magnetic flux and force is maintained, the stabilization functions automatically without any bigger adjustments.

In the FIG. 5 a magnetic polarity is created to the knife-edge flange with the help of formation devices 7,8 of a magnetic field in which case the propulsive force that centralizes the knife-edge flange between the magnets is caused with the magnets 9 located at the side of the flange 3. The polarity of the magnet 9 is chosen in such a way that the head of the magnet 9 directed towards the knife-edge flange 3 is similar with the polarity of the knife-edge flange 3 located at that place. In that case the forces pushing the knife-edge flange 3 sideways are created with the magnets 9 which forces centralize the knife-edge flange 3 between the magnets. The centralizing force of the magnets 9 advantageously increases by itself if the knife-edge flange 3 starts to deviate from the centre line, in other words moves closer to another magnet 9.

In the FIG. 6 the knife-edge flange 3 is magnetized with the help of a magnet 10 equipped with windings 11 in such a way that the poles 12 of the magnet directed to its sides are pushing and both push the knife-edge flange 3 in such a way that it aims to stay at the centre line.

The knife-edge flange can be magnetized also according to the method of the FIGS. 1 and 2 in which case the magnets 9 according to the FIG. 5 are located for example at the locations shown with dashed lines 9' in which locations the magnetic flux appears strongly in the knife-edge flange. Naturally magnets 9 can be located at any periphery angle area of the knife-edge flange and the knife-edge flange 3 can be formed to be magnetic at that point.

The magnetic parts 1,2 or 7,8 or 10,11 of the stabilization device according to the invention can be attached to the body of the sawing device also in such a way that they can be moved also during the sawing, if needed, if the circular blade 3 does not otherwise find its way to the planned line or the magnetizing force does not have enough energy to pull the circular blade to the right line. The force moving the circular blade 3 sideways can be increased in such a way that the part 1 or 7 pulls the blade a little bit from the side. The stabilization devices can naturally be moved and positioned also due to the reason that the circular blades 3 are adjusted to new locations at the axis 5 when one wants to saw products that have different thicknesses.

The invention claimed is:

1. Equipment for stabilizing rotation of a blade in a circle saw and for staying at the wanted sawing line which equipment comprises the formation devices (1,2); (7,8); (10,11) of a magnetic field in connection with a ferrous metallic circle saw blade (3) and equipment for adjusting the intensity of the mentioned magnetic field, such as a sensor (14) that measures the sideway position of a control center (13) and a circular blade (3), characterized in that of the formation devices of the magnetic field metallic parts (1); (7) or (10) that direct at least magnetic flux in the last resort to the circle saw blade (3) or part of them are located in relation to the circle saw blade (3) outside its toothing (4), at the location of the teeth essentially to the level of the circle saw blade (3).

2. Equipment according to the claim 1, characterized in that the metallic part (1) directing magnetic flux to the circle saw blade (3) and the metallic part receiving returning magnetic flux from the mentioned blade both are located successively outside the mentioned circle of the blade.

3. Equipment according to the claim 1, characterized in that the metallic part (7) directing magnetic flux to the circle saw blade (3) and the metallic part receiving returning magnetic flux from the mentioned blade both are located outside the mentioned circle of the blade at the opposite sides of the circular blade (3).

4. Equipment according to the claim 1, characterized in that at least [some] metallic parts (1); (7); (10) that direct the magnetic flux in the last resort to the circle saw blade (3) can be moved accordingly when the circular blades (3) that can be adjusted regarding their positions and distances (s) are moved.

5. Equipment according to the claim 1, characterized in that at least some metallic parts (1), (7); (10) that direct magnetic flux in the last resort to the circle saw blade (3) are located in relation to the axis (5) of the sawing device in such a way that the wood (6) to be sawed moves between them and the axis (5).

6. Equipment according to the claim 1, characterized in that several circular blades (3) that saw the wood (6) are located at the axis (5) in which case the formation devices (1,2), (7,8); (10) of the magnetic field are located partly interlocked, at different circle positions or at the both sides of the group of circular blades.

7. Equipment according to the claim 1, characterized in that at the sides of the circular blades (3) there are magnets (9), (12) that cause propulsive force to the circular blade (3).

\* \* \* \* \*